United States Patent Office 3,704,316
Patented Nov. 28, 1972

3,704,316
PREPARATION OF AMINO ACIDS BY HYDROLYSIS OF BACTERIAL CELLS OBTAINED BY FERMENTATION
Takemi Hanaoka, Toshiro Kakehashi, and Ryota Toyomasu, Saga-shi, and Tomio Yata, Yokohama-shi, Japan, assignors to Ajinomoto Co., Inc., Tokyo, Japan
No Drawing. Filed Jan. 13, 1970, Ser. No. 2,679
Int. Cl. C07c 99/02
U.S. Cl. 260—527 N          3 Claims

ABSTRACT OF THE DISCLOSURE

When bacterial cells obtained in the production of amino acids by a fermentation process are hydrolyzed with hydrochloric acid, humins are formed and have to be removed by filtration when other constituents of the cells are to be recovered. The filtration time is sharply reduced if the hydrolysis is carried out in the presence of an oxidizing agent.

This invention relates to treatment of bacterial cells, and more particularly to a process for hydrolyzing bacterial cells with hydrochloric acid. An object of this invention is to improve the filterability of a mixture resulting when bacterial cells are hydrolyzed with hydrochloric acid. Other objects will become apparent from the following description and claims.

Recently, fermentative production of amino acids, such as glutamic acid and lysine, yields large amounts of bacterial cells of microorganisms employed in the fermentation. Heretofore, such bacterial cells have been hydrolyzed in the processed fermentation broth with an acid, such as hydrochloric acid or sulfuric acid and the resulting acid-treated mixture filtered to remove the solid humins. The filtrate is utilized in other fields (U.S. Pat. No. 3,029,280 and Japanese patent publication No. 16732/1963) or the aimed-at fermentation product is recovered from the filtrate.

An acid-treated mixture resulting from a conventional hydrolysis with hydrochloric acid cannot be easily filtered, due to the fact that the humins formed in the mixture are apt to fill the openings of the filter cloth, and cakes of said humins are difficult to peel off the filter cloth.

The filterability of the acid-treated mixture cannot be improved by using a filter aid, as will be evident from the following Experiment 1.

EXPERIMENT 1

The pH value of a glutamic acid fermentation broth obtained by using acetic acid as the source of carbon (U.S. Pat. No. 3,117,915) was adjusted to approximately 3.2 with hydrochloric acid to crystallize glutamic acid. The glutamic acid crystals were separated and the mother liquor was concentrated. Three one-liter portions of the concentrate were each mixed with 300 ml. of concentrated hydrochloric acid and maintained at 115° C. for 6 hours for hydrolysis. The resulting acid-treated mixtures were cooled to 60° C., mixed with various amounts of diatomaceous earth as the filter aid, and then subjected to constant -pressure filtration (−450 mm. Hg G) to remove the humins formed. The results are shown in Table 1.

TABLE 1

| Filter aid used (g.) | 0 | 10 | 20 |
|---|---|---|---|
| Time required for filtration (sec.) | 310 | 290 | 305 |

That filterability cannot be improved significantly by changing the hydrochloric acid treatment conditions, will be evident from Experiments 2 and 3.

EXPERIMENT 2

Three one-liter portions of the same concentrate that was used in Experiment 1 were mixed with various amounts of concentrated hydrochloric acid and maintained at 115° C. for 6 hours for hydrolysis. The resulting acid-treated mixtures were cooled to 60° C. and subjected to constant-pressure filtration (−450 mm. Hg G) to remove the humins formed. The results are shown in the following table.

TABLE 2

| Hydrochloric acid added (ml.) | 300 | 350 | 400 |
|---|---|---|---|
| Time required for filtration (sec.) | 310 | 290 | 285 |

EXPERIMENT 3

Three one-liter portions of the same concentrate that was used in Experiment 1 were each mixed with 300 ml. of concentrated hydrochloric acid and maintained at 115° C. for various periods of time for hydrolysis. The resulting acid-treated mixtures were cooled to 60° C. and subjected to constant-pressure filtration (−450 mm. Hg G) to remove the humins formed. The results are shown in the following table.

TABLE 3

| Time required for hydrolysis (hrs.) | 6 | 9 | 15 |
|---|---|---|---|
| Time required for filtration (sec.) | 310 | 370 | 350 |

It has now been found that the filterability of an acid-treated hydrolysis mixture can be improved significantly by hydrolyzing bacterial cells with hydrochloric acid in the presence of an oxidizing agent.

In carrying out the process of this invention, the hydrochloric acid treatment conditions per se are obvious, for example, from U.S. Pats. Nos. 3,029,280 and 3,029,281 and Jap. Pat. Publns. Nos. 4311/1962 and 16732/1963.

Various organic and inorganic oxidizing agents may be used, such as hydrogen peroxide, benzoyl peroxide, potassium dichromate, potassium permanganate and sodium hypochlorite. Of these oxidizing agents, hydrogen peroxide is the best, because it hardly affects the subsequent steps. The amounts of oxidizing agent required depends on the amounts of bacterial cells, hydrolyzing time and other variables, but the most suitable amounts can be easily determined by preliminary experiments. Generally, relatively small amounts of an oxidizing agent suffice and, for example, a remarkable effect is brought about even with 20 ml. or less of aqueous 30% hydrogen peroxide solution per one liter of a bacterial cells suspension containing 10% by weight of bacterial cells.

This invention can be applied not only to those bacterial cells which have been separated from a fermentation broth but also to those which are suspended in a fermentation broth from which the aimed-at amino acids, have been separated or which still contains such products. The effects of this invention are greatest in a fermentation broth obtained by using acetic acid or acetates or hydrocarbons as a source of carbon.

This invention is further illustrated but not limited by the following examples.

EXAMPLE 1

Bacterial cells which had been separated on a continuous centrifuge from a glutamic acid fermentation broth using kerosene as the source of carbon (U.S. Pat. No. 3,222,258) were suspended in water and again treated with the centrifuge to wash them free of the accompanying substances. The washed bacterial cells were suspended in water to prepare a cell suspension containing about 10% by weight of the solid content.

Two one-liter portions of the suspension were mixed with different amounts of aqueous 30% hydrogen peroxide solution and 300 ml. of concentrated hydrochloric acid and maintained at 115° C. for 6 hours for hydrolysis.

The acid-treated mixtures were cooled to 60° C. and subjected to a constant-pressure filtration (−600 mm. HgG).

The results are shown in the following table.

TABLE 4

| | | |
|---|---|---|
| Hydrogen peroxide solution added (ml.) | [1] 0 | 17 |
| Time required for filtration (sec.) | 540 | 210 |

[1] Control.

EXAMPLE 2

Bacterial cells which had been separated with a continuous centrifuge from a lysine fermentation broth obtained by using glucose as the source of carbon (French Pat. No. 1,533,688) were suspended in water and again treated with the centrifuge to wash them free of the accompanying substances. The washed cells were suspended in water to prepare a cell suspension containing about 10% by weight of the solid content.

Two one-liter portions of the suspension were mixed with different amounts of aqueous 30% hydrogen peroxide solution and 300 ml. of concentrated hydrochloric acid and maintained at 115° C. for 6 hours for hydrolysis.

The acid-treated mixtures were cooled to 60° C. and subjected to a constant-pressure filtration (−450 mm. HgG) to remove the humins formed.

The results are shown in the following table.

TABLE 5

| | | |
|---|---|---|
| Hydrogen peroxide solution added (ml.) | [1] 0 | 17 |
| Time required for filtration (sec.) | 550 | 218 |

[1] Control.

EXAMPLE 3

The pH value of a glutamic acid fermentation broth using acetic acid as the source of carbon (U.S. Pat. No. 3,117,915) was adjusted to approximately 3.2 with hydrochloric acid to crystallize glutamic acid. The glutamic acid crystals were separated and the mother liquor was concentrated.

Four one-liter portions of the concentrate were mixed with various amounts of aqueous 30% hydrogen peroxide solution and 300 ml. of concentrated hydrochloric acid and maintained at 115° C. for 6 hours for hydrolysis.

The resulting acid-treated mixtures were cooled to 60° C. and subjected to a constant-pressure filtration (−450 mm. HgG) to remove the humins formed.

The results are shown in Table 6.

TABLE 6

| | | | | |
|---|---|---|---|---|
| Hydrogen peroxide solution added (ml.) | [1] 0 | 4 | 17 | 170 |
| Time required for filtration (sec.) | 310 | 230 | 150 | 80 |

[1] Control.

EXAMPLE 4

A glutamic acid fermentation broth using acetic acid as the source of carbon was concentrated.

Two one-liter portions of the concentrate were mixed with different amounts of benzoyl peroxide and 300 ml. of concentrated hydrochloric acid and maintained at 115° C. for 6 hours for hydrolysis.

The acid-treated mixtures were cooled to 60° C. and subjected to a constant-pressure filtration (−600 mm. HgG) to remove the humins formed.

The results are shown in Table 7.

TABLE 7

| | | |
|---|---|---|
| Benzoyl peroxide added (g.) | [1] 0 | 30 |
| Time required for filtration (sec.) | 240 | 159 |

[1] Control.

EXAMPLE 5

A glutamic acid fermentation broth using acetic acid as a source of carbon was neutralized with hydrochloric acid to crystallize glutamic acid. The glutamic acid crystals were separated and the mother liquor was concentrated.

Four one-liter portions of the concentrate were mixed with various oxidizing agents and 300 ml. of concentrated hydrochoric acid and maintained at 115° C. for 6 hours for hydrolysis.

The acid-treated mixtures were cooled to 60° C. and subjected to a constant-pressure filtration (−450 mm. HgG) to remove the humins formed.

The results are shown in Table 8.

Table 8

| Oxidizing agents: | Seconds [1] |
|---|---|
| None (control) | 260 |
| Potassium dichromate (30 g.) | 132 |
| Potassium permanganate (30 g.) | 156 |
| Aqueous 10% sodium hypochlorite solution (20 ml.) | 180 |

[1] Time required for filtration.

What we claim is:

1. In a method of producing amino acids by hydrolyzing bacterial cells obtained by fermentation at elevated temperature in an aqueous medium containing an effective amount of hydrochloric acid, whereby humins are formed, and filtering the hydrolysis mixture to remove said humins from the residual liquid, the improvement which comprises hydrolyzing said cells in the presence of an oxidizing agent, said oxidizing agent being hydrogen peroxide, benzoyl peroxide, potassium dichromate, potassium permanganate, or sodium hypochlorite.

2. In a method as set forth in claim 1, said oxidizing agent being added to said medium prior to said hydrolyzing.

3. In a method asset forth in claim 1, said oxidizing agent being dissolved in said medium.

References Cited

UNITED STATES PATENTS

| 2,419,256 | 4/1947 | Dorn | 260—527 N |
| 3,029,280 | 4/1962 | Motozaki et al. | 260—527 N |

VIVIAN GARNER, Primary Examiner